Patented Aug. 14, 1934

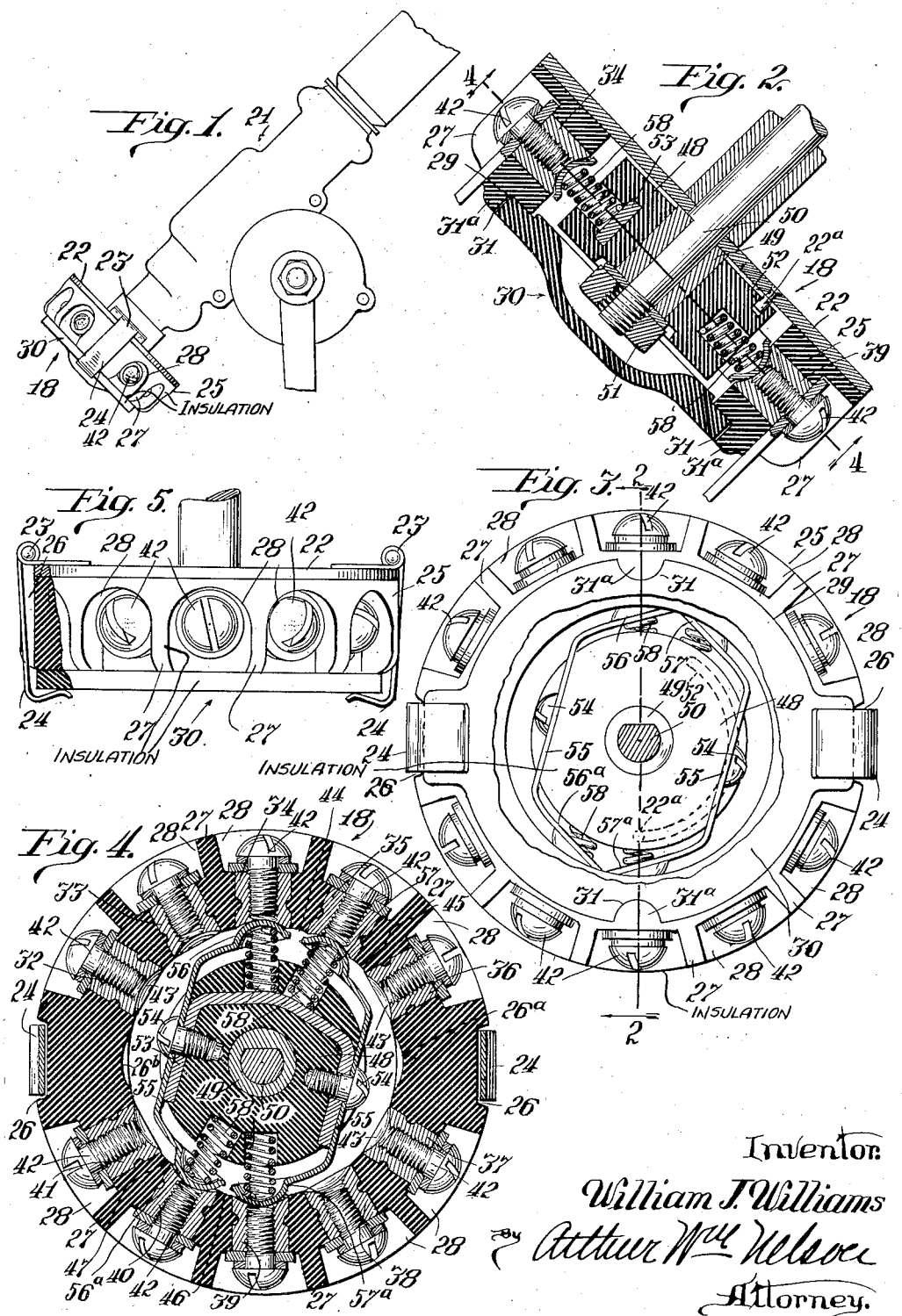

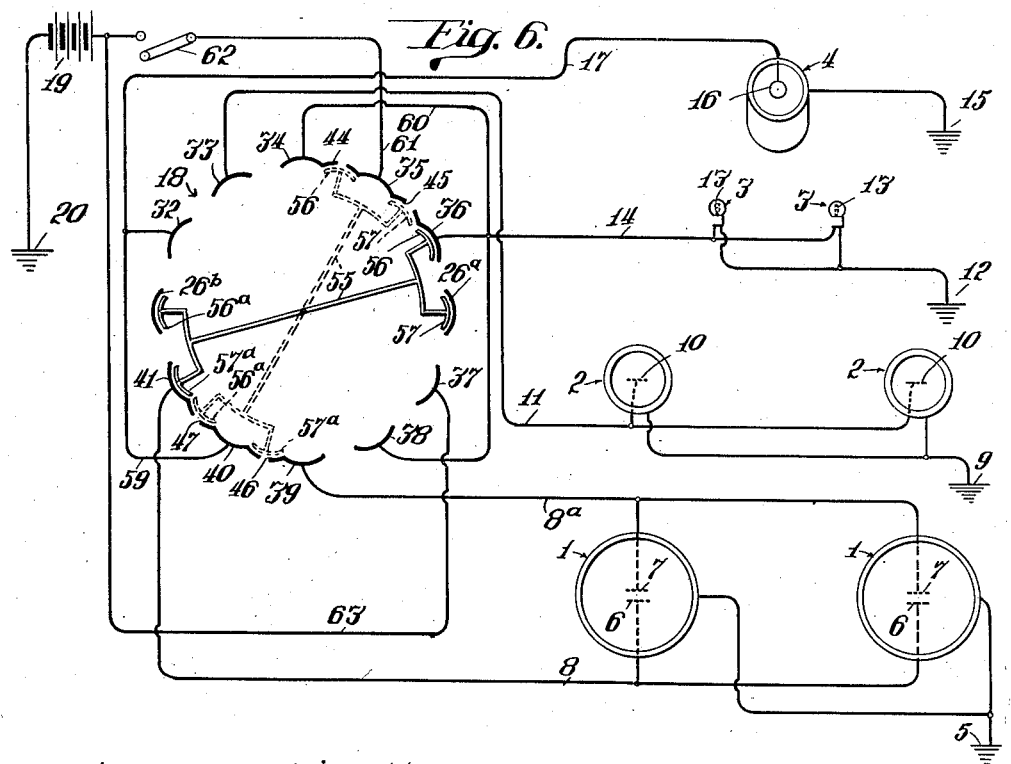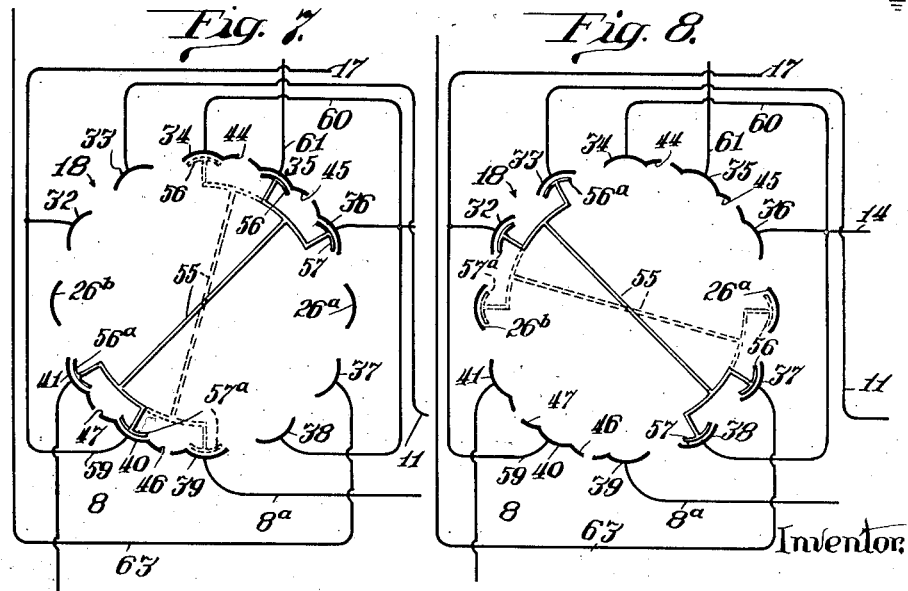

1,969,867

UNITED STATES PATENT OFFICE 1,969,867

SWITCH FOR AUTOMOTIVE LIGHTING SYSTEMS

William J. Williams, Chicago, Ill., assignor to Motor Devices, Inc., Chicago, Ill., a corporation of Illinois Application September 15, 1930, Serial No. 481,950

7 Claims. (Cl. 200—8)

This invention relates to improvements in a switch for an automotive lighting system and it consists in the matters hereinafter described and more particularly pointed out in the appended claims.

The primary object of the invention is to provide a switch for a lighting system of this kind whereby any combination of running or parking lights desired may be readily produced by the manipulation of the switch.

Another object of the invention is to provide a switch of this kind wherein each and every light in the associated system is grounded at one side and may have its other side connected to and disconnected from a source of current supply by said switch in a manner making it impossible for short circuits to develop therein.

Still a further object of the invention is to provide a switch of this kind which includes as a part thereof, having fixed and movable contacts whereby any desired light combination is possible and which switch is so constructed as to be readily made and assembled and require but a minimum of wiring.

These objects of the invention as well as others together with the many advantages thereof, will more fully appear as I proceed with my specification.

In the drawings:—

Fig. 1 is a view in side elevation of a bottom end of a steering post of an automobile having applied thereto an improved switch whereby my improved lighting system is possible.

Fig. 2 is a longitudinal sectional view therethrough on an enlarged scale as taken on the line 2—2 of Fig. 3.

Fig. 3 is a view in end elevation of the same with parts of the cover thereof broken away to more clearly show the interior construction.

Fig. 4 is a transverse vertical sectional view through the same as taken on the line 4—4 of Fig. 2.

Fig. 5 is a view in side elevation of the fixed contact carrying member and the supporting plate of the switch which will be more fully referred to later.

Fig. 6 is a diagrammatic view of the improved system and switch employed in connection with an automotive lighting system and wherein the switch is shown in its "off" condition.

Figs. 7 and 8 are diagrammatic views of the switch in positions different from that shown in Fig. 6.

In general, my improved system and switch is directly associated with a lighting system including the head, tail, parking and dash lights of an automotive vehicle, such lights being the ones most used when the vehicle is in service and is either in movement or is temporarily parked.

Referring now in detail to that embodiment of the invention illustrated in the drawings and especially to Fig. 6:—1—1 indicate the headlights, 2—2 indicate the parking or cowl lights, 3—3 indicate the dash or instrument board lights and 4 indicates the tail light of an automotive vehicle such as an automobile and all disposed thereon in the manner well known.

Each headlight which is grounded at one side as at 5 is of the kind having bulbs with double filaments 6 and 7 respectively, the former for the "bright" or "high beam" light and the latter for "dim" or "low beam" light. The filaments 6 of both lights are connected to a common conductor 8 while the filaments 7 of both lights are connected to a second common conductor 8ª. The parking lights 3 which are usually mounted on the cowl of the vehicle are both grounded at one side as at 9 and each has a single filament 10 and the filaments of both of these lights are connected to a common conductor 11. The dash lights 3 which are usually mounted on the instrument board for illuminating the various instruments thereof, are both grounded at one side as at 12 and each light includes a single filament 13. The filaments 13 of both dash lights are connected to a common conductor 14. The tail light 4 which is usually mounted in a casing with a so-called "stop light" (not shown) is grounded at one side as at 15 and its filament 16 is connected to a conductor 17.

The conductors 8, 8ª, 11, 14 and 17 which are the "feeds" for the various lights mentioned, all lead to a single switch 18 by which the passage of current from a source of current supply such as a battery 19 is controlled, the battery being grounded at one side as at 20. The switch is preferably disposed at the bottom end of the steering post or mast 21 of an automobile.

Said switch includes a metallic supporting plate 22 which is fixed to the outer tube of the post or mast in any suitable manner and at diametrically opposite sides thereof are hinged as at 23 spring retaining fingers 24 the purpose of which will presently appear. On said plate is detachably secured, an annular base 25 of moulded insulation. Said base is formed at opposite sides of its exterior surface with shallow recesses 26—26 to accommodate the fingers 24—24 before mentioned and annularly spaced from said recesses are radial flanges 27 that provide in the periphery of said base between the recesses 26, a plurality of pockets 28. That end of said base which engages the plate is made flat to snugly fit against the same while the other end of said base is provided with an annular flange 29 in which is engaged a cover 30 that closes the associated end of the base. When the cover is so disposed upon the base, the free ends of the fingers 24 overhang and engage opposite portions of the cover to not only secure the cover to the base but also to secure the base to the supporting plate 22. To aid in properly positioning the cover, the same is provided at diametrically opposite sides (arranged at 180° with respect to the fingers 24) with recesses 31 to engage enlargements or studs 31ª formed on the flange 29.

Anchored in the base in the radial plane of the pockets 28 thereof are contact plugs 32, 33, 34, 35 and 36 arranged to one side of the plane of the recesses 26 and similar plugs 37, 38, 39, 40 and 41 arranged to the opposite side of the plane of said recesses. Associated with and screw threaded into each plug, in an associated recess 28 is a terminal 42 for attachment of suitable conductor ends to the various contact plugs. In this respect it is pointed out that each terminal is fully protected against accidental engagement by such tools as are being used in working upon adjacent parts of the automobile.

Each contact plug is provided at its inner end with a concaved recess 43 and that part of the inner surface of the base, in line with the recesses 26 is formed with similar recesses 26ª—26ᵇ respectively. Those portions of the inner surface of the base between the contact plugs 34, 35 and 35, 36 as well as those portions of the base between the contact plugs 39, 40 and 40, 41 are formed to provide concaved recesses 44, 45 and 46, 47 respectively. These recesses in fact provide duplex contacts because as will later appear, certain associated movable contacts when engaged therein bridge and engage contact plugs upon opposite sides thereof. Hence for convenience of further description these recesses will be referred to as duplex contacts.

Within the base is located a rotor 48. This rotor which is made of moulded insulation, has anchored axially therein a metallic plug 49 adapted for a broached or flat sided engagement with an operating shaft 50 that extends axially up through the steering post beyond the steering wheel where it is provided with a lever (not shown) for manipulation. Said rotor is secured to said shaft by a nut 51. In that surface of the rotor 50 engaged with the supporting plate is provided an arcuate recess 52 the ends of which engage a pin 22ª on said plate to limit its turning movement. Also, anchored in the rotor is a metallic member 53 to opposite sides of which are secured as by screws 54, contact arms 55 carrying contact fingers 56, 56ª and 57—57ª respectively at their ends. Each finger is made concavo-convexed for engagement with the various coacting concaved contact surfaces before mentioned. In this instance, it is pointed out that the fingers 56—56ª and 57—57ª are radially spaced apart to correspond with the radial spacing between the various contact plugs and to insure positive contact of said fingers, each is backed up by a spring 58.

The contact 32 which has the tail light conductor 17 connected thereto is electrically connected to the contact 40 by a conductor 59 while the contact 33 has the parking light conductor 11 connected thereto. The contact 34 is connected by a conductor 60 with the contact 38 and said conductor is also connected to the dash light conductor 14 which is connected to the contact 36. The contact 35 is connected to the battery 19 by a conductor 61 in which is provided a lockable switch indicated as at 62 whereby said conductor may be locked in its open condition when so desired. Preferably, this switch is incorporated in the ignition system of the automobile but as is apparent, it can be positioned wherever desired. The contact 37 is also connected to the battery 19 by a conductor 63 in a manner in no way to be affected by the operation of the switch 62. The conductor 8ª for the low beam or dim filaments 7—7 of the headlights, is connected to the contact 39 while the conductor 8 for the high beam or bright filaments 6—6 of the headlight is connected to the contact 41. It is apparent that the conductor 61 constitutes the lockable feeder for the system and the conductor 63 constitutes the normally closed feeder for the system.

When the switch is in its "off" position as shown in full lines in Fig. 6 the rotor is in a position wherein the finger 56 is engaged with the plug 36, the finger 57 is engaged in the recess 26ª and the finger 57ª is engaged with the plug 41 while the finger 56ª is engaged in the recess 26ᵇ. Thus even though said fingers 56 and 57ª connect the conductors 14 and 8 together through the arms 55, both of said conductors are "dead" because they are in no way connected up with the battery 19.

Assume it is desired to employ the bright lights, the dash lights and the tail lights as when driving along a highway. Of course, the switch 62 must first be closed to connect the feeder 61 to the battery. Thereafter the rotor is turned counterclockwise to engage the finger 56 with the contact 35 and the finger 57 with the contact 36 while the finger 57ª is engaged with the contact 40 and the finger 56ª is engaged with the contact 40 and the finger 56ª is engaged with the contact 41. This connects the conductors 8, 14 and 17 with the battery 19 so that the bright light filaments 6, dash light filaments 13 and tail light filament 16 are all energized to produce illumination.

When the rotor is turned to the dotted line position shown in Fig. 7, the fingers 56 and 57 engage the contact 34—35 and the fingers 56ª—57ª engage the contact 40 and 39 so that the low beam headlight filaments 7, the dash light filaments 13 and tail light filament 16 are connected to the battery and are all energized to produce illumination.

In some instances it might be desired to have use of both high and low beam headlight filaments as this increases visibility at both near and far range. To produce this result it is only necessary to turn the rotor in a reverse or clockwise direction to engage the fingers 56—57 with the duplex contacts 44—45 respectively and the contacts 56ª—57ª with the contacts 46—47 respectively and this will connect the conductors 8, 8ª, 14 and 17 respectively with said battery as shown in dotted lines in said Fig. 6. Should an approaching car require dimming of the headlights the rotor is swung back to the dotted line position in said Fig. 7.

When parking parallel with a curb it is desired to have both the parking lights 2 and tail light 4 "on" and this must be accomplished even with the feeder 61 open as when the switch 62 is locked open to disconnect the feeder 61 from the battery. To employ the parking and tail lights under such a condition the rotor is turned clockwise into the full line position shown in full lines in Fig. 8 when the fingers 56—57 are engaged with the contact 37—38 respectively and the fingers 56ª—57ª are engaged with the contacts 33—32 respectively. This connects the coductors 11 and 17 with the feeder conductor 63 so that the parking and tail lights are illuminated.

When angle parking is permitted; that, is parking at an angle to the curb, it is only necessary to employ the tail light, all others being "off". To attain this result, it is only necessary to turn the rotor in the reverse direction into the dotted line position shown in said figure to bring the fingers 56—57 into engagement with the recess 25ª and contact 37 respectively and the fingers 56ª—57ª into engagement with the contact 32 and recess 25ᵇ respectively. This connects the tail light conductor 17 with the feeder 63, all other lights being "off". Thus even with the feeder 61 locked in an open condition, it is possible to employ both lights alone by connecting them to the feeder 63.

It is apparent from the foregoing that by means of the system and its switch described that many variations or combination of lights may be attained. By one movement of the switch it is possible to cause illumination of the dash, tail and high beam headlights. By another switch movement the dash, tail and low beam headlight may be used and by a third one it is possible to have the dash and tail lights on together with both the high and low beam headlighs. Again, it is possible to use only the parking and tail light or the tail light alone when all the other lights are locked in "off" condition.

The switch structure described is compact in arrangement and is indeed durable and the various terminals thereof are protected against such accidental engagement with other objects that would produce a short circuit. It is also apparent that the contact base of the switch may be easily removed and replaced for inspection or other purposes and makes automotive wiring during assembly a comparatively easy matter.

While in describing the invention, I have referred in detail to the form, construction and arrangement of the parts of the system and switch, the same is to be considered merely as illustrative so that I do not wish to be limited thereto except as may be specifically set forth in the appended claims.

I claim as my invention:—

1. A switch for the purpose described embodying a member having arcuately spaced fixed contacts therein, a second member made of insulation material and having a metallic element anchored therein, said members being relatively rotatable and a pair of duplex spring contact fingers carried by said second member, one on each side thereof and fixed to said metallic element anchored therein and adapted in the relative rotation of said members to engage certain associated contacts on the first mentioned member to electrically connect them together.

2. A switch for the purpose described comprising a member of insulation having a central chamber therein, radially arranged arcuately spaced contacts in said member opening at one end into said chamber and provided at the other end outside of said member with conductor securing means, a second member of insulation arranged in said chamber and relatively rotatable with respect to the first mentioned member, a metallic element anchored in said second mentioned member and a pair of duplex spring contact fingers carried by said second member, one on each side thereof and fixed to said metallic element anchored therein and adapted in the relative rotation between said members to engage with certain ones of said associated contacts opening into said chamber to electrically connect them together.

3. A switch for the purpose described comprising a member of insulation having a central chamber therein, a plurality of arcuately spaced contacts anchored in said member and arranged in sets to open into said chamber, a second member of insulation arranged in said chamber and relatively rotatable with respect to the first mentioned member, a metallic element anchored in the second member and a pair of duplex spring contact fingers carried by said second member one on each side thereof and fixed to said metallic element therein and adapted in the relative rotation between said members to engage desired contacts of both sets of contacts in the first mentioned member.

4. A switch for the purpose described comprising a member of insulation having a central chamber therein, a plurality of arcuately spaced contacts anchored in said member and arranged in sets to open into said chamber, a second member of insulation arranged in said chamber and relatively rotatable with respect to the first mentioned member, and flat on one side thereof, a metallic element anchored in said second member and having a part exposed along said flat side thereof and a duplex contact member fixed at a point between its ends to the exposed part of said metallic element and having yielding fingers adapted in the relative rotation between said members to engage desired contacts of both sets of contacts in the first mentioned member.

5. A switch for the purpose described comprising a member of insulation having a central chamber therein, a plurality of arcuately spaced contacts anchored in said member and arranged in sets to open into said chamber, a second member of insulation arranged in said chamber and relatively rotatable with respect to the first mentioned member, a U-shaped metallic member anchored in said second member and having a pair of side arms exposed at opposite sides of said second member, a duplex contact member at each side of said second member and each fixed at its mid portion to one of said side arms of said metallic element and each including a pair of yielding end fingers adapted in the relative rotation between said members to engage desired contacts of both sets of contacts in the first mentioned member.

6. A switch for the purpose described comprising an annular member of insulation having a central chamber therein and formed in its periphery with sets of arcuately spaced pockets, sets of contacts anchored in said member and each opening at one end into said central chamber and each opening at the other end into an associated pocket, a terminal member engaged in each fixed contact and having a part arranged in an associated pocket for securing a conductor thereto, a second member of insulation arranged in said chamber and relatively rotatable with respect to said first member, a U-shaped member anchored in said second member and having a pair of side arms exposed at opposite sides of said second member, and a duplex contact member at each side of said second member and fixed at its mid portion to one of said side arms of said metallic element and each including a pair of yielding end fingers adapted in the relative rotation between said members to engage desired contacts of both sets of contacts in the first mentioned member.

7. A switch for the purpose described, embodying therein a supporting plate adapted to be fixed to the bottom end of a steering post, an annular member of insulation engaged flat at one end against said plate and having an annular flange at its other end, a plurality of contacts anchored in said member and opening into the interior thereof, a member of insulation arranged in the interior of said first member and rotatable with respect thereto, contact fingers carried by said second member and adapted to engage said contacts that open into the interior of said first mentioned member, a cover for said other end of said first member and engaged in said flange and which cover and first mentioned member have interengaging parts preventing relative rotation therebetween, and spring fingers carried by said plate and operable to engage between pairs of shoulders on opposite sides of the first mentioned member and to engage said cover to removably hold said cover and first mentioned member on said base and plate and against turning movement thereon.

WILLIAM J. WILLIAMS.